Figure 1:
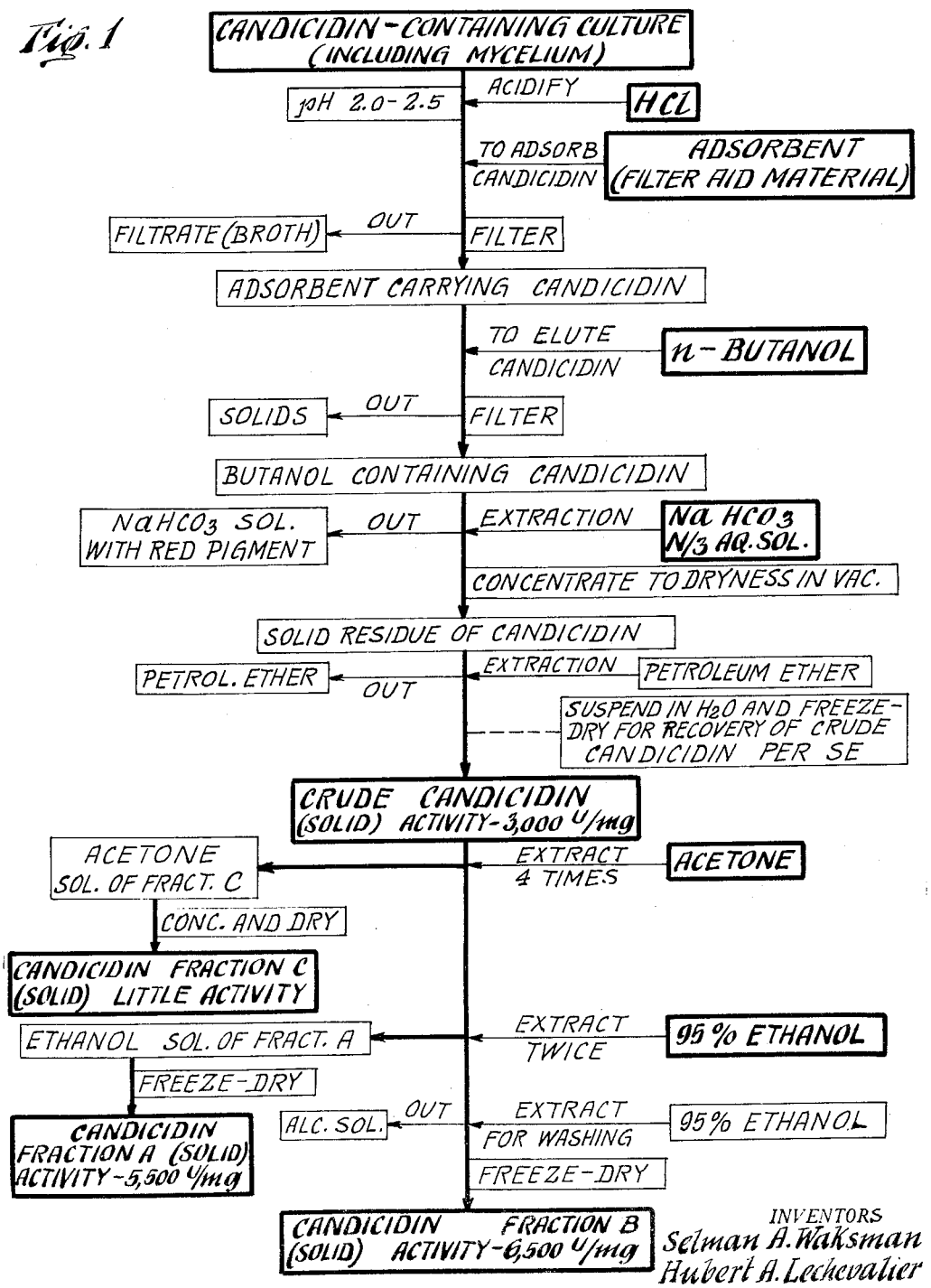

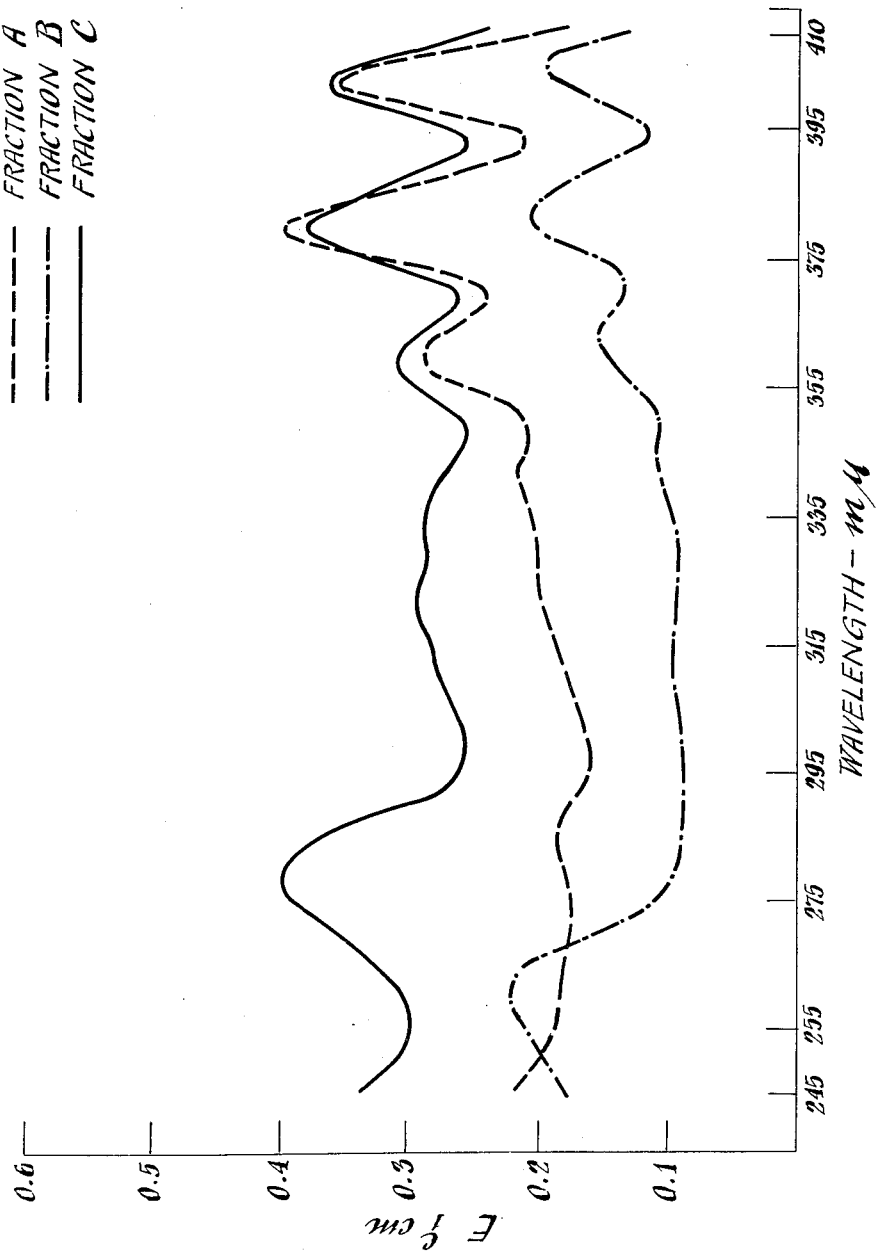

United States Patent Office 2,992,162
Patented July 11, 1961

2,992,162
CANDICIDIN AND PROCESS OF PREPARATION
Selman A. Waksman and Hubert A. Lechevalier, New Brunswick, N.J., assignors to Rutgers Research and Educational Foundation, New Brunswick, N.J., a nonprofit corporation of New Jersey
Filed Sept. 9, 1952, Ser. No. 308,616
4 Claims. (Cl. 167—65)

This invention relates to new organic chemical substances, viz. antibiotic compositions of the class of Streptomyces antibiotics, and to methods of preparing such substances. More particularly the invention relates to a new antifungal composition or complex and certain fractions of it, which have now been produced by cultivation under artificial conditions of a micro-organism of the genus Streptomyces, specifically a strain of *Streptomyces griseus*. The new antibiotic has been named "candicidin" and may be conveniently so identified herein. It exhibits high antifungal activity against a considerable variety of fungi, being efficiently fungistatic (markedly so against yeast and yeast-like fungi), and also fungicidal toward certan organisms, particularly *Candida albicans*. The novel antibiotic, considered as a complex or mixture, and likewise each of its fractions, particularly those hereinbelow defined as candicidin A and candicidin B, is unquestionably different from known antifungal agents such as actidione, antimycin A, fradicin, fungicidin, rimocidin and actinone. Candicidin, especially with respect to its fractions A and B and mixtures of them, has shown important utility in treatment of fungus infections of animals and plants, with no toxic effects and no detriment to the germination or growth of plant life.

In the accompanying drawings:

FIG. 1 is a combined flow diagram showing procedure for extracting candicidin and for separating its fractions; and FIG. 2 is a graph of the ultra-violet spectra of the respective fractions.

The micro-organism which was used in the operations discovered (as described below) to product candicidin has been classified as belonging to the species *Streptomyces griseus*, by reason of its cultural and morphological properties. Minor differences distinguish it from commonly known strains of *S. griseus*, e.g. streptomycin-producing strains and grisein-producing strains. This newly identified strain of *S. griseus* has been deposited in the culture collection of the Department of Microbiology of Rutgers University, the State University of New Jersey, as No. 3570. The following table describes certain morphological and cultural properties of the organism, together with corresponding properties of a streptomycin-producing strain of the same species:

TABLE I

*Morphological and cultural properties of S. griseus and No. 3570*

| | *S. griseus* (streptomycin-producing) | No. 3570 |
|---|---|---|
| Structure of aerial mycelium on yeast-dextrose and Czapek's agars. | Branching filaments forming tufts of straight sporulating hyphae. | Branching filaments forming tufts of curved sporulating hyphae. |
| Gelatin stab | Rapid liquefaction. Greenish-yellow or cream colored surface growth with brownish tinge. | Rapid liquefaction. Flaky growth falls to bottom. Faint brownish pigment. |
| Czapek's agar | Thin, colorless, spreading, becoming olive buff. Aerial mycelium thick powdery, water green. | Poor growth, thin cream colored, with brownish dark tinge in vegetative growth and greenish tinge in aerial mycelium. |
| Yeast-dextrose agar | Cream colored growth elevated in center, grey-green powdery aerial mycelium. | Cream colored lichnoid growth, grey powdery aerial mycelium. |
| Nutrient agar | Abundant cream colored, lichnoid growth powdery, white to light grey aerial mycelium. | Cream colored growth thin, powdery, light grey aerial mycelium. |
| Glucose-asparagine | Thin cream colored growth. Light grey aerial mycelium. No soluble pigment. | Same. |
| Litmus milk | Cream colored ring. Coagulation with rapid peptonization, becoming aklaline. | Coagulation rapid with peptonization, becoming alkaline. |
| Potato plug | Brownish, lichnoid growth, covered with white powdery aerial mycelium. No soluble pigment. | Same. |
| Pigment | Not soluble in medium | Same. |
| Nitrate reduction | + | +. |
| Optimum temperature | 37° C | 37° C. |
| Sensitivity to phage M-1 | Sensitive | Resistant. |
| Sensitivity to streptomycin | 100 mcg./ml | 2 mcg./ml. |
| Source | Garden soil | Cow manure. |

It has thus been discovered that by cultivation of this organism under artificial conditions (e.g. upon inoculating a suitable, sterile medium with spores of the organism or with submerged growth) the new antibiotic or antibiotic complex, candicidin, is produced, including its particularly useful fractions A and B. It may be noted that the substance resulting from such cultivation and from initial stages of separation procedure as described below, usually constitutes a complex of fractions A, B and C, and is sometimes herein identified as crude candicidin; although fractions A and B are of particularly useful antifungal character (both individually and in admixture with each other), the complex or crude candicidin which also includes fraction C has nevertheless been found of distinct utility and because of less complexity in its production, may be deemed to represent a definitely new product of practical value as such. While other culture media may be employed, and likewise other modes of growth (e.g. in shallow stationary cultures), effective results have been obtained by growing the named organism on a yeast extract-containing medium under submerged aerobic conditions. After cultivation for a period of several days at appropriate temperature with shaking as on a conventional shaking machine, crude candicidin may be extracted from the culture, e.g. by suitable adsorption and solvent extraction as explained below. By further treatment, for example involving solvent separation or chromatography, fractions A, B and C are individually recovered.

The crude candicidin, which is not necessarily so styled because it has foreign impurities (from which in some cases it may even be essentially free) but because it contains all three fractions, if found to represent a substantially stable and highly effective antifungal agent, having apparently no action on bacteria, mycobacteria or actinomycetes. As stated above, an important application of candicidin, both in its crude or complex state and in the form of either of its fractions A and B, is in controlling fungus infections or disease of plant and animal life.

The following are some examples of procedures for producing and extracting this antibiotic.

In one such process, the described strain of *Streptomyces griseus* (No. 3570) was grown in yeast-dextrose broth, i.e. in shaken culture, for four days, the broth at the end of this time being found to have a pH of 8.1 and to exhibit an activity of 900 candicidin "units" per milliliter. For this and other assay purposes mentioned herein, so-called dilution assays were employed rather than diffusion methods, in that candicidin does not diffuse readily in agar media. Thus using the streak-dilution assay method, one unit of candicidin was defined as the minimum amount of the antibiotic per one milliliter of peptone-glucose agar, which would completely inhibit the growth of *Candida albicans*. The peptone-glucose agar medium utilized for assay purposes consisted of 1% glucose, 0.5% peptone, 0.5% sodium chloride, 0.3% meat extract and 1.5% agar, in tap water, the pH being adjusted to give 7.2 after sterilization. For assay purposes, the inoculum consisted of an 18 hour old culture of *C. albicans* grown on yeast-glucose agar, although it appeared that differences in the age of the *C. albicans* culture used for assays by the streak dilution method did not cause appreciable variation.

It will be understood, therefore, that references herein to the activity or potency of candicidin preparations in the above units (i.e. "dilution units") are generally to be taken as meaning the number of the defined minimum quantities of candicidin per milliliter of the preparation in question.

For extraction of crude candicidin from the yeast-dextrose broth cultivated as described above, one procedure was as follows: the broth, after separation of the mycelium by filtration, was extracted three times with one-sixth of its volume of n-butanol. The aqueous layer, which had no appreciable activity, was discarded, and the butanol extract was concentrated in vacuo and then freeze dried. The resulting solid preparation of crude candicidin was found to have a strength of 900 units per milligram. The yield by this method of operation represented 20 to 40% of the activity in the culture broth.

Another and particularly effective mode of producing candicidin comprised the cultivation of the stated organism on yeast-glucose medium. A satisfactory, specific medium of this character consisted of bacto yeast extract 1%, cerelose (commercial glucose) 1%, and tap water; before sterilization the pH was adjusted to 7.5 with 20% sodium hydroxide solution, and the medium was then sterilized in a conventional manner. For effective production in substantial quantity with this medium, the following steps were found useful. A primary inoculum of *S. griseus* No. 3570 was first prepared by transferring spores from agar slants into 250 ml. flasks each containing 100 ml. of the described yeast-glucose medium. These flasks were shaken for 24 hours at 28° C. and the cultures were used to inoculate a series of similar flasks, which were identically incubated for a further 24 hours, to provide a secondary inoculum. Finally, large flasks, i.e. 2000 ml. flasks, each containing 300 ml. of the same medium, were then each inoculated with one of the cultures of the second inoculum and were shaken at 28° C. for four days. At the end of that time the large flasks were found to contain broths having candicidin potencies of 1000 to 5000 units per ml., the cultivation thus being very effective for production of the antibiotic, i.e. in its crude or complex state.

Using the same method of sterilization, inoculation and incubation, the following medium gave even higher yields (10,000 to 20,000 units per ml.) than the yeast-glucose medium: a soya peptone-glucose medium, for example consisting of 2% soya peptone (De Lamar-Hendrey) and 1% cerelose, in tap water.

Yet another cultivation process for making candicidin involved the use of a glutamic acid-glucose medium. One effective medium of this character contained the following (parts being given in grams or milliliters):

| | | |
|---|---|---|
| $K_2HPO_4$ | g— | 0.5 |
| $MgSO_4 \cdot 7H_2O$ | g— | 0.2 |
| $Fe(SO_4)_3 \cdot 9H_2O$ | g— | 0.01 |
| $ZnSO_4 \cdot 7H_2O$ | g— | 0.01 |
| Anhydrous glucose | g— | 10. |
| L-glutamic acid | g— | 10. |
| Distilled water | ml— | 1000 |

The pH of the medium was adjusted to 7.3 (with NaOH) before sterilization in a conventional manner, e.g. sterilization by autoclaving at 15 pounds for 15 minutes. In this case, 250 milliliter flasks each containing 100 ml. of the medium were inoculated with a washed one-day-old yeast-glucose shake culture of *S. griseus* No. 3570. So inoculated, the culture medium was incubated by maintaining the flasks on a shaking machine at 28° C., for five days. Broths having candicidin potencies of 3000 to 5000 units were obtained by such operation.

An improved and particularly effective extraction procedure, which has been utilized for the yeast-glucose and glutamic acid-glucose broths (it being understood nevertheless that each of the various extraction procedures described herein can be used with any of the cultivation methods) was the following, illustrated in the upper part of FIG. 1. As the result of growth of the organism under the conditions outlined above, e.g. growth on the yeast-glucose medium, the culture attained a pH value of 7.5 to 8.5. The entire culture, including the mycelium, was treated with hydrochloric acid to give a pH of 2.5. The acidified broth was then treated with material to adsorb or retain the active material, a suitable adsorbent being filter aid material such as diatomaceous earth. Thus specifically, the acidified culture, still including the mycelium, was stirred for 10 minutes with 0.5% Hyflo Super-Cel, viz. a filter aid substance of the type described. The resulting Super-Cel pad was filtered off and was found to retain, at least in substantial measure, the antibiotic present both in the broth and in the mycelium.

A suspension was then made by mixing equal volumes of the wet Super-Cel and n-butanol. The solvent, i.e the butanol, took on a deep red color and was found to contain the active substance. It was accordingly filtered, and the insoluble material was discarded. The butanol solution was then treated by extracting it exhaustively with 2% of its volume of one-third normal sodium bicarbonate solution; by such extraction the color was substantially removed, the $NaHCO_3$ extraction thus being understood to separate the pigment. The residual, more or less decolorized butanol was then concentrated to dryness in vacuo and the dry residue was extracted with petroleum ether. It appeared that most or all of the activity remained in the residue which was insoluble in the petroleum ether, such solvent (which presumably removed further impurities) being correspondingly discarded. The residue from the petroleum ether extraction was then suspended in water and freeze dried, to produce a preparation of crude candicidin which contained approximately 3000 units per milligram.

The extraction thus resulted in a relatively potent candicidin product, the actual yield (measured against the cultivated broth) being from 40 to 60%. It conclusively appeared that this product represented the same antibiotic (crude candicidin or the candicidin complex) as was obtained by the extraction procedure described above, except that the product of the more complete procedure was considerably purer. As explained, it was further found that crude candicidin essentially consists of three fractions, herein called A, B and C. Fractions A and B had almost equivalent biological activity and do not appear, from present experiments, to be differentiated by their anti-microbial spectra. The third fraction, i.e. fraction C, was found to have negligible activity, although as a component of crude candicidin, fraction C does not seem deleterious.

It was discovered that the three fractions could be separated by a variety of procedures, one convenient mode being with organic solvents. For instance, crude candicidin may be extracted first with acetone, which is found to dissolve the fraction C, leaving a solid residue which contains both fractions A and B. Upon extracting this residue with alcohol (i.e. ethanol) candicidin A is separated in solution, the remaining alcohol-insoluble solid then constituting candicidin B.

By way of specific example of this solvent method (as shown in the lower part of FIG. 1) for separating the fractions: 1.9 grams of crude candicidin obtained (as described above) by the more complete extraction process from an incubated yeast-glucose broth and having an activity of 3000 units per mg., were extracted four times with acetone, using 25 milliliters each time. The acetone fractions were combined and found to contain fraction C of the crude material, such fraction being isolated by a suitable process such as evaporation in vacuo and appropriate freeze drying. As explained, fraction C has no significant biological activity.

The solid residue from the butanol extraction in itself constitutes a very useful antibiotic composition, being a concentrate of fractions A and B, although a somewhat purer preparation of such character may be obtained by later re-mixing the ultimately separated and dried fractions. For effecting such separation the above-described solid residue (from butanol extraction) was extracted twice with 25 ml. of 95% ethanol. Combining the quantities of ethanol (separated from the solid) the alcohol solution was then freeze dried to yield 500 milligrams of a solid product, identified as fraction A and having an activity of 5500 candicidin units per milligram. The solid residue left from the ethanol extraction was then extracted four more times with 25 milliliters of ethanol, the further alcohol solutions being discarded. After such washing, the remaining solid (upon appropriate drying) was found to represent fraction B, having a weight of 420 mg. and an activity of 6500 candicidin units per milligram. It will thus be seen that candicidin A and candicidin B are distinguished by insolubility in acetone, in which fraction C is soluble. At the same time, fraction A is soluble in ethanol, while fraction B is not.

Crude candicidin has also been purified, and specifically separated into its fractions, by chromatography, for example on a chromatographic column composed of cellulose powder. The column was prepared by pouring a water suspension of cellulose powder into a glass tube; while still moist, it was washed successively with equal amounts of ethylene glycol monomethyl ether, ethanol, and chloroform. The column (2.5 cm. in diameter and 70 cm. high) was then loaded with a chloroform suspension of crude candicidin, e.g. the product of the more complete extraction process described above, having an activity of 3000 units per mg. The chloroform suspension, with which the column was loaded, contained approximately 40 million units of candicidin.

Successive elutions were effected, i.e. by using a total series of 18 solvent cuts in a conventional manner, for recovery of the several fractions. The first elution was carried out with 95% ethanol and yielded a reddish brown eluate, fraction C. Further elution was accomplished by the addition of an equal mixture of ethylene glycol monomethyl ether and ethanol. This mixture eluted first a reddish brown compound, fraction A, followed by a greenish compound, fraction B. As far as could be determined from the comparison of their biological spectra, solubility properties, ultra violet adsorption spectra, and Rf-value upon paper chromatography, these three fractions A, B and C were identical with the corresponding fractions obtained by solvent extraction.

Referring now more specifically to the properties of candicidin, it is apparent, especially since fraction C exhibited little or no antibiotic activity, that the activity of crude candicidin is due to the action of fractions A and B. The following table represents the antifungal spectrum of crude candicidin (i.e. the candicidin complex) extended through a considerable number of fungus organisms, including particularly yeasts and yeast-like fungi. In attaining this spectrum, the various organisms were tested on peptone-glucose medium, with incubation in each case for 2 to 5 days at 28° C. The readings are expressed in micrograms of crude candicidin (being the 3000 unit material) per milliliter of medium for complete inhibition; thus the lower the value of the reading, the greater or more potent the activity against a given organism.

TABLE II

*Antifungal spectrum of crude candicidin*

| | Microgram/per ml. for complete inhibition |
|---|---|
| Acrostalagmus sp. | >10 |
| Alternaria sp. | 0.6–10 |
| Aspergillus niger | 5–70 |
| Candida albicans | 0.3–0.5 |
| Cercospora kikuchii | 8–15 |
| Ceratostomella ulmi (P. strain) | 0.15–0.3 |
| C. ulmi (H. strain) | 3–5 |
| Botrytis sp. | 16–50 |
| Diaporthe sp. | 13–70 |
| Epicoccun sp. | 30–50 |
| Fusarium sp. | 66–>100 |
| Helminthosporium sp. | 13–20 |
| Hormodendron sp. | 30–50 |
| Isaria sp. | >100 |
| Oospora sp. | >100 |
| Mucor sp. | 3–10 |
| Penicillium notatum | 5–100 |
| Pestalizzia sp. | 0.6 |
| Phoma sp. | 66–100 |
| Polyporus sulphureus | 8–20 |
| Pullularia sp. | 1–3 |
| Pythium sp. | 66–100 |
| Saccharomyces cerevisiae | <0.15–0.3 |
| Sclerotium rolfsii | >100 |
| Spicaria sp. | >100 |
| Stemphylium sp. | >85 |
| Stysanus sp. | >100 |
| Trichoderma sp. | 20–30 |
| Ustilago zeae | 1–20 |
| Verticillium sp. | 0.6–>100 |

The spectrum of crude candicidin was also extended through a considerable range of other types of organisms, such as bacteria (including mycobacteria) and actinomycetes, but no activity was found against any organisms of these kinds, despite the test of a considerable variety. Thus even with concentrations of crude candicidin equaling from 85 to 100 micrograms per milliliter of a nutrient agar medium, effective inhibition was not obtained (in streak dilution tests involving incubation at 37° C. for 18 to 48 hours), with any of the following organisms:

*Escherichia coli*
*Aerobacter aerogenes*
*Serratia marcescens*
*Pseudomonas fluorescens*
Bodenheimer's organism
*Staphylococcus aureus*
*Bacillus subtilis*
*Mycobacterium phlei*
*M. avium*
Mycobacterium sp. 607
*Streptomyces fradiae*

The antifungal spectrum of fraction B, taken with a considerable number of different organisms is represented in the following table, wherein tests were made on peptone-glucose agar as in the case of Table II, above, with results given, again, in micrograms per ml. for complete inhibition:

TABLE III

*Antifungal spectrum of fraction B*

| Organism | Days of Incubation | |
|---|---|---|
| | 1 | 5 |
| Aspergillus niger [1] | 2 | >10 |
| Candida albicans [2] | 0.22 | 1.1 |
| C. brumptii [2] | 3.3 | >10 |
| C. kruseii [2] | 1 | 2.2 |
| C. neoformans [2] | | 0.5 |
| C. pseudotropicalis [2] | 1.7 | >10 |
| C. stellatoides [2] | 0.14 | 1.1 |
| C. tropicalis [2] | 2 | >10 |
| Ceratostomella ulmi (P. strain) [1] | | 1.1 |
| Cryptococcus neoformans [2] | | 0.5 |
| Fusarium sp. [2] | | 10 |
| Hormodendrum pedrosoi [1] | | >10 |
| Mucor sp. [1] | 0.1 | |
| Penicillium notatum [1] | | 1.1 |
| Phialophora verrucosa [1] | | >10 |
| Rhizopus nigricans [1] | >10 | >10 |
| Saccharomyces cerevisiae [2] | 0.06 | 0.14 |
| Sporotrichum schenkii [1] | | >10 |
| Trichophyton gypsum [1] | | >10 |
| T. mentagrophytes [1] | | >10 |

[1] Incubated at 28° C.
[2] Incubated at 37° C.

Tests also showed that the antibiotic spectra of fractions A and B differed only in degree of inhibition of the test organisms, a representative comparison being shown in the following table, where assays were made on the peptone-glucose medium, but wherein the results are expressed in candicidin dilution units per milligram (for inhibition), such that the larger figures represent greater activity.

TABLE IV

*Comparison of antifungal activities of fractions A and B*

| | Dilution units per mg. Fractions | |
|---|---|---|
| | A | B |
| Candida albicans | 2,000 | 3,000 |
| Ceratostomella ulmi | >10,000 | >10,000 |
| Trichoderma sp | 90 | 250 |
| Penicillium notatum | <90 | <250 |
| Aspergillus niger | 200 | 200 |
| Rhizopus nigricans | <90 | <250 |

In addition to its fungistatic effect, candicidin was found to have substantial fungicidal activity. Thus the crude material was applied to heavy suspensions of cells *Candida albicans*; complete sterilization of a suspension of resting cells was effected in three hours with a concentration of 5 micrograms per ml., while 1 microgram per ml. was found sufficient to sterilize a culture of growing cells in three hours. When *C. ulmi* and *A. niger* were tested in a similar manner only little fungicidal activity was obtained for candicidin.

Crude candicidin, i.e. the complex containing fractions A, B and C, was found to be soluble in the higher alcohols (such as glycerol and benzyl alcohol) but insoluble in benzene, petroleum ether, carbon tetrachloride, xylol, carbon disulfide, ethylene dichloride, ether, and ethyl acetate. Each of the fractions is therefore likewise soluble in the higher alcohols and insoluble in each of the last-named group of organic liquids. Further data on solubility of the crude or complex material and the fractions are set forth in the following table, wherein plus signs indicate solubility, minus signs indicate that the material is insoluble and wherein a combination of plus and minus signs indicates partial solubility:

TABLE V

*Solubility of candicidin (complex and fractions)*

| | Crude candicidin | Fraction | | |
|---|---|---|---|---|
| | | A | B | C |
| Water | + | + | − | − |
| Ethanol | + | + | −* | + |
| Butanol | + | + | +* | + |
| Ethylene glycol (EG) | + | + | +* | + |
| EG monomethyl ether | + | + | +* | + |
| Acetone | + | − | − | + |

The solubility indicated by plus signs represents generally a high solubility, except in the instances marked with an asterisk, where there was somewhat less, but nevertheless substantial, solubility. That is, the fraction B solid preparations appeared to have a solubility in these solvents of about 100 micrograms per ml. It will be noted that only fraction A is soluble in water, and that only fraction C is soluble in acetone and that there is likewise a difference among the fractions with respect to solubility in ethanol.

Candicidin appeared to have reasonably good stability, both at room and other temperatures, concentrated solutions being more stable than dilute ones. At neutrality, each of fractions A and B effectively withstood heating for 10 minutes at 60° C., and in one set of tests was kept for a week at 4° C. without appreciable loss of activity. Thus it would appear that the antibiotic, especially its active fractions, can be effectively stored under low temperature conditions for relatively long times. Each of fractions A and B showed progressive loss of activity upon standing at room temperature, i.e. when dissolved in ethylene glycol monomethyl ether.

The three fractions of candicidin had very similar ultra violet absorption spectra as shown in FIG. 2. These spectra were attained with solutions of the respective substances, i.e. fractions A, B and C, in absolute methanol, by conventional procedure using a Beckmann spectrophotometer. The concentration of fraction A was 0.04 milligram per milliliter, of fraction B 0.02 mg. per ml., and of fraction C 0.1 mg. per ml. In the graph shown, wave lengths are measured along the horizontal axis and spectral intensity is indicated on the vertical axis by specific extinction, a conventional representation of intensity duly correlated with the actual concentration of the substance in its solution. Specifically, significant peaks were obtained for the three substances as follows, the wave length being measured in millimicrons in each instance:

Fraction A _____ 360, 380, 403 mμ
Fraction B _____ 362, 381, 404 mμ
Fraction C _____ 358, 379, 402 mμ

The sets of three peaks noted respectively for the three fractions constitute distinctive characterizations of them, distinguishing them from other antibiotic substances of this class.

It was also found that crude candicidin did not dialyze through a cellophane membrane, it being correspondingly apparent that none of the fractions would so dialyze.

Elementary analysis of fraction A gave the following values on an ash free basis: H=9.6%, C=62.9% and N=4.7%. Fraction B was somewhat different: H=9.9%, C=57.8% and N=7.3%. Some sulfur could also be detected in both fractions but it is very possible that it was present as an impurity in the ash.

As stated above, candicidin (and thus its active fractions A and B) has exhibited utility for controlling fungus infections in plants, with no deleterious effects on germination, growth, foliage or other factors of importance in agriculture. For example, in one set of tests crude candicidin was found to have no ill effect upon the germination of pea seeds, i.e. in concentrations (of candicidin complex) of 125 micrograms per milliliter or less, and even at somewhat higher concentrations the effects were not very serious. In making these tests, 2 ml. of the candicidin solution (i.e. the 3000 unit material described above) were added to 5.5 centimeter petri dishes each containing 5 to 10 pea seeds. These dishes were placed inside regular size (9.0 cm.) dishes containing an absorbent pad saturated with water. The seeds were incubated for 5 to 6 days at 20° C., and both germination and root growth were measured, relative to controls which were similarly incubated but without the candicidin. As stated, no ill effects were observed in either respect, up to a rather large concentration of the antibiotic.

In one set of practical tests relative to the utility of the antibiotic for control of fungus infections, it was found that upon spraying young bean plants once a week with an aqueous suspension of crude candicidin (660 micrograms per ml.) there resulted an effective and useful decrease of a powdery mildew infection. The spraying was started about 5 days before the mildew infection was apparent on the plant leaves, it being known that the plants had been or would become infected with the organism causing the infection. Although a single spraying before the appearance of the mildew did not reveal therapeutic value, the use of a plurality of sprayings, e.g. at the indicated intervals, was effective. No toxic reactions, e.g. in damage to foliage or otherwise, were noted in the tests.

It will be appreciated that upon comparison with other antibiotics that are produced by actinomycetes and that are antifungal and lack antibacterial activity, candicidin is clearly distinguished in a number of ways, including its various properties and characteristics outlined above. Critical distinction is afforded by the ultra violet absorption spectra since such spectra for the candicidin fractions were distinctly different from the spectra for actidione, antimycin A, fradicin, fungicidin and rimocidin. Although the substance actinone was not available for the making of spectra for comparison, clear distinction was evident in other respects; thus known data indicate that actinone is less active in vitro than candicidin and that the solubility properties and the nitrogen content of the two substances are clearly dissimilar.

Although by way of example reference has been made above to *S. griseus* No. 3570, other strains of *S. griseus* have been isolated from soil which have been found to have the capacity to produce the candicidin complex. Likewise, still other Streptomyces strains (different from *S. griseus*) such as a culture identified as No. 3633 in the above-mentioned Rutgers University culture collection, have the capacity to produce selectively fraction A (the water soluble fraction) of candicidin.

It is to be understood that the invention is not limited to the specific preparations and procedures hereinabove described but may be carried out in other ways without departure from its spirit.

We claim:
1. Candicidin, an organic antifungal antibiotic composition: which is soluble in methanol, butanol, glycerol, benzyl alcohol, ethylene glycol, and monomethyl ether of ethylene glycol; which is insoluble in acetone, benzene, petroleum ether, carbon tetrachloride, xylol, carbon disulfide, ethylene dichloride, ether and ethyl acetate; which in methanolic solution displays absorption peaks of ultraviolet light at approximately the following wave lengths expressed in millimicrons, 360–62, 380–81 and 403–4; which is strongly active against fungi, including yeasts, yeast-like fungi and plant-pathogenic fungi; which has substantial fungistatic effect upon

Candida albicans
Ceratostomella ulmi
Saccharomyces cerevisiae which is relatively inactive against bacteria, mycobacteria and actinomycetes; which has substantial fungicidal effect on *Candida albincans*; which is capable of embodiment in water-soluble form A and in water-insoluble form B, each of said forms having all of the aforesaid properties; and which is produced by the process of growing a culture of *Streptomyces griseus* No. 3570 in a nutrient medium at a suitable incubation temperature and for a suitable period of cultivation to form the composition in the culture, and then recovering the so produced composition from the culture.

2. A process for producing the antibiotic composition candicidin, which is defined in claim 1, comprising growing a culture of *Streptomyces griseus* No. 3570 in an aqueous, sugar-containing nutrient medium at a suitable incubation temperature and for a suitable period of cultivation to form candicidin in the culture, and separating candicidin from the culture medium.

3. In a process for producing the antibiotic substance candicidin, which is defined in claim 1, the steps of establishing a material containing candicidin by growing a culture of *Streptomyces griseus* No. 3570 in an aqueous nutrient medium, separating the candicidin from said material by treatment with butanol to dissolve the candicidin, separating the butanol solution from said material, and separating candicidin from the butanol.

4. A process for producing the antibiotic composition candicidin, which is defined in claim 1, comprising growing a culture of *Streptomyces griseus* No. 3570 in a nutrient medium at a suitable incubation temperature and for a suitable period of cultivation to form candicidin in said culture, and then recovering the so produced candicidin from the culture.

References Cited in the file of this patent

UNITED STATES PATENTS

| | | |
|---|---|---|
| 2,482,055 | Duggar | Sept. 13, 1949 |
| 2,540,284 | Peck | Feb. 6, 1951 |
| 2,633,445 | Marsh et al. | Mar. 31, 1953 |
| 2,652,356 | Hanson et al. | Sept. 15, 1953 |
| 2,657,170 | Keitt et al. | Oct. 27, 1953 |
| 2,658,018 | Gottshall et al. | Nov. 3, 1953 |
| 2,723,216 | Cohen | Nov. 8, 1955 |

OTHER REFERENCES

Trussell et al.: Journal Bacteriology, June 1947, pages 769 to 770.

Ford et al.: J.A.C.S., volume 70, March 1948, pages 1223 to 1225.

Reynolds et al.: Proce. Soc. Expt'l. Biol. and Med., pages 50 to 54, particularly page 53, volume 64, January 1947.

Schatz et al.: Mycologia, pages 461 to 463, XL: 4, 1948.

Waksman et al.: Proc. Soc. Expt'l. Biol. and Med., pages 308 to 312, on pages 308 and 309, 1949.

Lechevalier: Oct. 17, 1953, Extraite de Le Presse Medicale, 11 pp.

Hickey et al.: Antibiotics and Chemotherapy, vol. 2, No. 9, September 1952, pp. 472–483.

Taber et al.: Antibiotics and Chemotherapy, vol. 4, pp. 455–461.

Welch: "Antibiotics Annual 1953–1954," pp. 191–194, article by Dutcher et al.

Gilliam et al.: Electronic Absorption Spectroscopy, pub. London, England, by Edward Arnold, Ltd., 1954, pp. 165 and 251.

Williams: Review of Scientific Instruments, 1948, p. 142.

Nachod: Determination of Organic Structure by Physical Methods, 1955, p. 158.

Welch: Antibiotics Annual, 1953–54, pp. 191–194, article by Dutcher et al.

New and Non-Official Remedies, 1955, pp. XXXI–XXXIV (NNR).